United States Patent [19]

Otomo

[11] B 3,998,523

[45] Dec. 21, 1976

[54] ELECTRO-OPTIC CERAMIC MATERIAL

[75] Inventor: Yoshiro Otomo, Mitaka, Japan

[73] Assignee: Hitachi, Ltd., Japan

[22] Filed: July 31, 1973

[21] Appl. No.: 384,225

[44] Published under the second Trial Voluntary Protest Program on March 16, 1976 as document No. B 384,225.

[30] Foreign Application Priority Data

July 31, 1972 Japan .............................. 47-75916

[52] U.S. Cl. ............................ 350/150; 350/160 R; 353/122; 353/98; 340/173.2
[51] Int. Cl.$^2$ ......................................... G02F 1/26
[58] Field of Search ............ 350/150, 160; 340/173

[56] References Cited

UNITED STATES PATENTS

| | | | |
|---|---|---|---|
| 3,609,002 | 9/1971 | Fraser | 350/150 |
| 3,612,656 | 10/1971 | Maldonado | 350/150 |
| 3,614,200 | 10/1971 | Taylor | 350/150 |

OTHER PUBLICATIONS

Thacher, Electrocaloric Effects in Some Ferroelectric and Antiferroelectric Comp., Journal of App. Phys., vol. 39, No. 4, Mar. 1968, pp. 1996–2002.
Roberts, Strain Biased PLZT Input Devices for Holographic Memories and Optical Data Processing, Applied Optics, vol. 11, No. 2, Feb. 1972, pp. 397–404.

*Primary Examiner*—R. V. Rolinec
*Assistant Examiner*—Michael J. Tokar
*Attorney, Agent, or Firm*—Craig & Antonelli

[57] ABSTRACT

An electro-optic ceramic material useful for electro-optic applications comprising an anti-ferroelectric phase (or para-electric phase) and a ferroelectric phase, the two phases of which coexist having a morphotrophic phase boundary. The scattering of light applied to the ceramic material can be changed by a voltage applied to the ceramic material whereby the anti-ferroelectric phase (or para-electric phase) and the ferroelectric phase are reversibly changed and thus the morphotrophic phase boundary is shifted corresponding to the phase changes.

30 Claims, 16 Drawing Figures

ELECTRO-OPTIC CERAMIC MATERIAL

BACKGROUND OF THE INVENTION

The present invention relates to electro-optic ceramic materials and more particularly to ceramics in which an anti-ferroelectric phase (or para-electric phase) and a ferroelectric phase coexist having a morphotrophic phase boundary. The invention further relates to electro-optic ceramics having optical properties different between the anti-ferroelectric phase (or para-electric phase) and the ferroelectric phase.

DESCRIPTION OF THE PRIOR ART

There have been electro-optic ceramic materials known in the art, such as for example, ferroelectric transparent ceramics (hereinafter briefly, PLZT) with several mole percent of La added to a $Pb(Zr, Ti)O_3$ solid solution system. When this PLZT is hot-pressed to a thin wafer and the polarization is oriented toward the thickness direction, the light scattering phenomenon is reduced and the birefringence becomes zero. While, when the polarization is oriented toward the surface direction, the scattering and birefringence are increased. Therefore, in the application of PLZT in the ferroelectric phase to an electro-optic element where the light transmitted through the PLZT is controlled by the electric field applied to the PLZT, the arrangement of the electrodes and the manner of applying voltage thereto are inevitably complicated. In other words, since the electric field must be changed between one mode in which polarization of the PLZT plate is oriented parallel to the direction of light propagation and another mode in which polarization is oriented perpendicular to the direction of light propagation, known systems employing PLZT electro-optic elements are complicated. In such electro-optic elements, the ratio of the maximum transmitted light $I_{max}$ to the minimum transmitted light $I_{min}$ (hereinafter briefly, contrast ratio) is not large enough. This is because the PLZT electro-optic element has been used in the art only depending on its ferroelectric phase (hereinafter briefly, FE phase). In the FE phase, the PLZT displays a light scattering phenomenon even if the mean value of polarization of a sample is zero. Hence, when the element is interposed between a polarizer and an analyzer which are disposed with their polarities perpendicular to each other, the minimum transmitted light $I_{min}$ is always finite. This has made it difficult to increase the contrast ratio $I_{max}/I_{min}$. The present inventors, however, discovered that in the anti-ferroelectric phase (hereinafter briefly, AF phase), the PLZT displays no light scattering phenomenon. The result of experiments indicates that there is no difference in the optically double refractive anisotropy in both PLZT crystallines (AF and FE phases). It is inferred that the light scattering phenomenon in the FE phase is ascribed to the difference in the orientation of spontaneous polarization in the grain boundary. Thus, by switching the phase of a PLZT between the FE phase and the AF phase, a longitudinal electro-optic effect is realized. More specifically, the effect realized is that the light scattering quantity of the PLZT plate is controlled by applying an electric field parallel to the direction of light propagation only. Since this operating method is easy, this method is of significant value.

Figure 1:
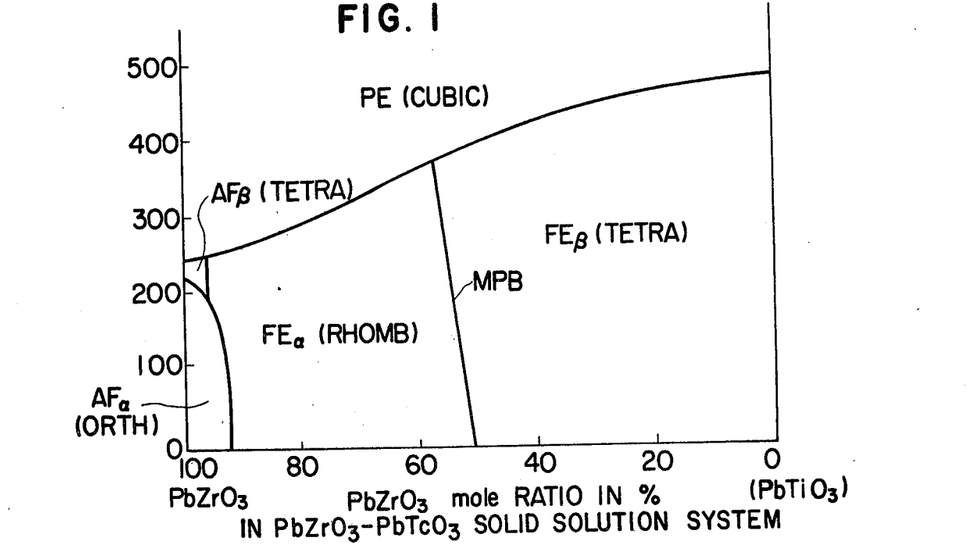
FIG. 1 is a phase diagram showing the relationship between temperature and the $PbZrO_3$ mole ratio in $PbZrO_3$-$PbTiO_3$ solid solution system.

Whereas, according to the invention, the anti-ferroelectric $PbZrO_3$ and the ferroelectric $PbTiO_3$ are composed into a solid solution system, of which the mole ratio (%) of $PbZrO_3$ to $PbTiO_3$; i.e., the relationship between the composition and the temperature, is as shown in FIG. 1, indicating that this electro-optic material has excellent properties.

More specifically, the material exhibits anti-ferroelectricity having an orthorhombic system when the mole ratio of $PbZrO_3$ to $PbTiO_3$ (i.e., Zr/Ti) is larger than 90%. While it exhibits ferroelectricity when the mole ratio is smaller than 90%. In this material, there are the $FE_\alpha$ phase having rhombic structure on the side of $PbZrO_3$, and the $FE_\beta$ phase of tetragonal system on the side of $PbTiO_3$. There appears a phase boundary at the mole ratio around 53% where the crystal form is changed with change in the composition. This crystal structural change is susceptible to the mole ratio but almost free of temperature change.

This phase boundary, appearing with the change in the composition of a solid solution system is called morphotrophic phase boundary (hereinafter briefly, MPB).

According to the inventors of this invention, the MPB of a solid solution system has the following properties.

1. Morphotrophic phase boundary of a first order phase transition.

a. Generally, the MPB occurs to different places with respect to temperature and composition according to whether the sample having a large thermal hysteresis and MPB is cooled from high temperature or heated from low temperature. The MPB appearing when it is cooled from high temperature is hereinafter referred to as MPB in cooling, or briefly MPB($c$). The MPB appearing when it is heated from low temperature is hereinafter referred to as MPB in heating, or briefly MPB($h$). In the region between MPB($c$) and MPB($h$), one of the phases is stable and the other is meta-stable, and the two phases can coexist.

b. Generally, when an electric field is applied to the sample in the range of specific temperature or composition, the MPB shifts by the cause of temperature or composition. After the removal of electric field, however, it remains in the shifted state.

2. The MPB is shifted by an electric field. This is because an FE phase is induced by the electric field applied to the sample.

a. When the MPB is between two kinds of FE phases such as FE$_\alpha$ phase and Fe$_\beta$ phase, the phase of larger spontaneous polarization Ps is induced in case of single crystal. As a result, the MPB shifts to the phase of smaller Ps. In the ceramics, the phase of larger Ps along the electric field applied is induced, and the MPB shifts to the phase of smaller Ps.

b. When the MPB is between the Fe phase and the para-electric phase (hereinafter briefly, PF phase), the FE phase increases by an electric field applied, and the MPB shifts to the side of PE phase.

c. When the MPB is between the AF phase and the FE phase, the MPB shifts to the side of AF phase as a result of the application of an electric field, as in the case of (b) above. In (b) and (c) above, when an electric field is applied to the sample, an FE phase is induced and the MPB shifts to the side of AF phase (or PF phase). However, there is limitation on the induction of FE phase and hence the MPB does not move beyond a certain specific place. This boundary limitation is called morphotrophic phase boundary limited by high teemperature, or briefly MPB($t$).

3. In the region between MPB($t$) and MPB($h$), the MPB returns to its initial position when the electric field applied is removed. In other words, there is no memory function. While, in the region where the temperature is lower than in MPB($h$), a phase transition runs from the phase of larger Ps or $\overline{P}s$ to the phase of smaller Ps or $\overline{P}s$ when a reverse electric field is applied. When it becomes sufficiently lower than MPB($h$) in temperature, the phase of larger Ps or $\overline{P}s$ remains unchanged even by applying a reverse electric field thereto. In this state, the MPB is not switched to the phase of smaller Ps or $\overline{P}s$. In this specification the limitation of MPB switchable to the phase of smaller Ps or $\overline{P}s$ by the application of a reverse electric field is referred to as MPB($m$) or alternatively as the limiting morthotropic phase boundary.

Figure 2:
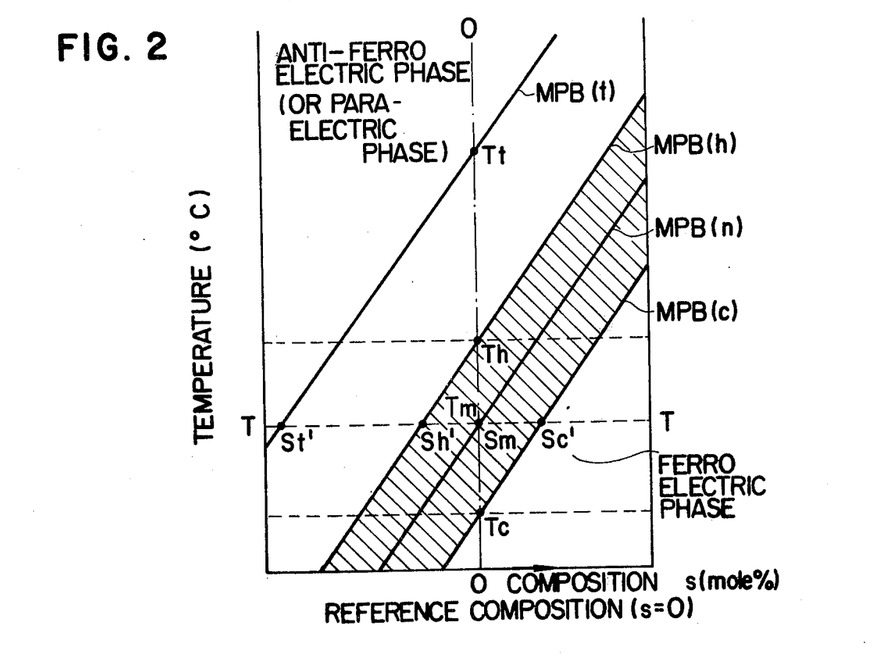
FIG. 2 is a phase diagram showing the relationship between phases and the change in composition of solid solution.

FIG. 2 shows the characteristics of MPB in terms of the relationship between the composition and the temperature, based on the compositional reference ($x=0$) of an electro-optic ceramic material. FIG. 2 indicates the following facts.

a. The AF phase (or PF phase) and the FE phase can coexist only in the phase state intermediate between MPB($c$) and MPB($h$).

b. In electro-optic ceramic materials of the same composition, the two phases can coexist only between the temperature points T$h$ and T$c$. The thermo-dynamic potentials of the two phases are equal to each other at the point T$m$ (temperature $m$) of MPB($m$), and the two phases are fully stable.

c. The two phases can coexist only within the range of composition points S$h'$ and S$c'$ at the same temperature. The composition points S$t'$ represents the limiting point of MPB which can shift into the AF phase (or PF phase) by an external force (electric field).

Figure 3:
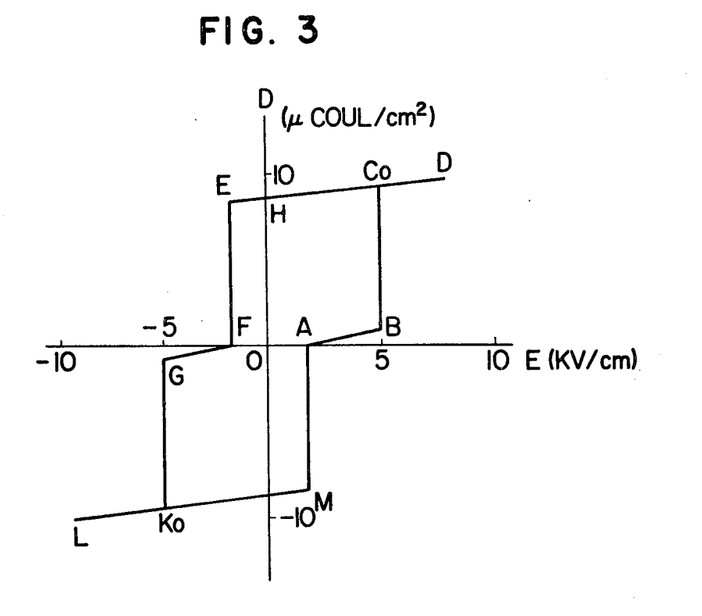
FIG. 3 is a diagram showing the D-E hysteresis loop of a material realized according to the invention.
Figure 4:
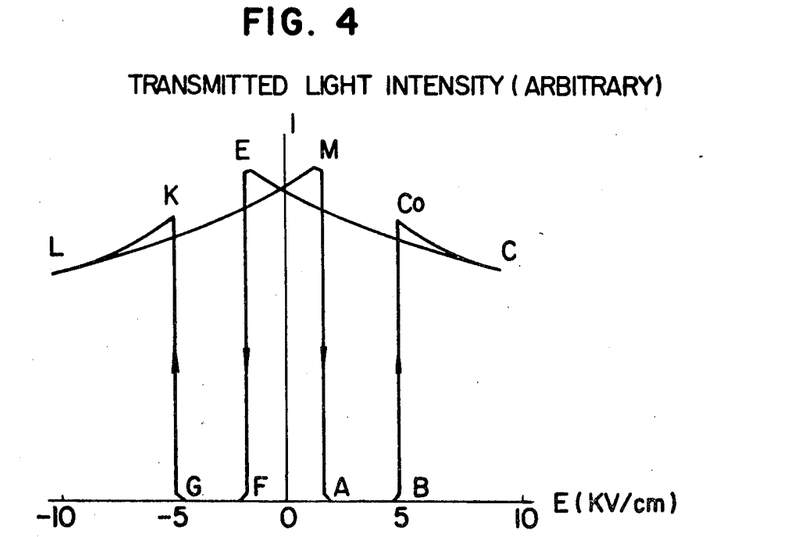
FIG. 4 is a diagram showing the I-E characteristic of another material realized according to the invention.

FIGS. 3 and 4 show the electric displacement versus electric field characteristic (D-E characteristic) and the transmitted light intensity versus electric field characteristic (I-E characteristic) of a solid solution in which the FE phase and the AF phase (or PF phase) are coexistent. FIG. 3 shows the D-E characteristics indicated by A--B and F--G obtained when an electric field in the range of O--B (or O--F) is applied to a solid solution in the AF phase (or PF phase) state. FIG. 3 indicates the fact that in this range of electric field the sample produces an electric displacement proportional to the electric field applied. After the removal of electric field, it returns to its initial state. While, if an electric field exceeding the threshold value B (or G) is applied, an FE phase is induced. As a result, an electric displacement indicated by the point C$o$ (or K$o$) is produced. At an electric field above the threshold value B, the electric displacement D is saturated, the polarization remains at H even at zero electric field, and the FE state is maintained. If a reverse electric field exceeding E is applied to the sample solid solution, the FE state returns to the AF (or PF) state. If a reverse electric field exceeding G is applied thereto, an FE phase is induced again. These phenomena indicate that the D-E characteristics of a solid solution in which the two phases coexist comprise double hysteresis loops as shown by ABC$o$, CHEFGK$o$M. This sample material is hot-pressed into a thin plate, transparent electrodes are installed on both surfaces thereof respectively, and the thin sample in combination with a Vabinet Solaille-compensator 4 (shown in FIG. 6) is interposed between a polarizer and an analyzer, and an alternating electric field is applied to the thin sample to vary the polarization. The relationship between the amount of light transmitted therethrough and the alternating electric field applied is shown in terms of I-E characteristic in FIG. 4. It is apparent that the light scattering is nearly zero in the AF phase (or PF phase) which corresponds to A--B and F--G of the double hysteresis loop in FIG. 3. The minimum transmitted light I$_{min}$ is nearly zero. If, however, the electric field applied to the thin sample exceeds the threshold value B, and FE phase is induced with the result that light scattering and/or double refractive anisotropy takes place and the maximum transmitted light I$_{max}$ increases. Hence, in principle, the contrast ratio I$_{max}$/I$_{min}$ of the transmitted light can be infinitely increased by utilizing the change in the state of FE phase and AF phase of the thin sample. FIG. 4 shows the I-E characteristics ABC$o$CEFGK$o$L corresponding to the electric field applied to the thin sample as in FIG. 3.

Figure 5:
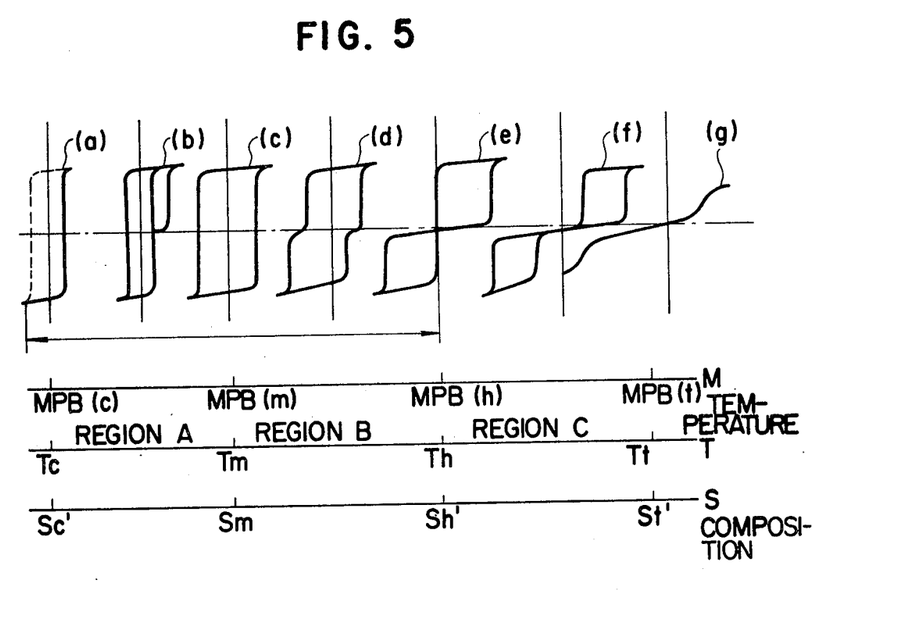
FIG. 5 is a diagram showing the D-E hysteresis loop corresponding to the points $c$, $m$, $h$ and $t$ on the phase diagram of FIG. 2.

In FIG. 2, T$t$, T$h$, T$m$, T$c$, and S$t'$, S$h'$, S$m$, S$c'$ . . . represent temperatures and compositions respectively at which MPB($t$), MPB($h$), MPB($m$) and MPB($c$) occurs along the reference equi-composition line O—O and equi-temperature line T—T. The D-E characteristics at these temperature and composition points and in the intermediate temperature and composition regions are given in hysteresis loops (a), (b), (c), (d), (e), (f), and (g) as shown in FIG. 5. In FIG. 5, the straight lines M, T and S represent the MPB, temperature and composition, respectively, corresponding to the seven hysteresis loops. The D-E characteristics in FIG. 5 indicate that only the region between MPB(m) and MPB(t) show the double hysteresis loop. In the region between MPB(h) and MPB(t), phase transition does not reversibly occur even if the electric field applied is reversed. In other words, it is in the region between MPB(h) and MPB(m) that phase transition can be reversibly made by an external force (electric field) applied to a solid solution in which the AF phase (or PF phase) and the FE phase coexist having the MPB.

Thus, according to the invention, a solid solution in which the AF phase (or PF phase) and the FE phase coexist having a MPB between MPB(h) and MPB(m) is used and a reverse electric field exceeding the threshold value is applied thereto and thus the light scattering and/or double refractive state can be reversibly realized in the FE phase as the light scattering is zero in the AF phase.

SUMMARY OF THE INVENTION

An object of the invention is to provide an electro-optic ceramic material having a large contrast ratio $I_{max}/I_{min}$ and with memory function.

Another object of the invention is to provide an electro-optic device using the electro-optic ceramic material realized according to the invention.

Briefly, the invention utilizes the solid solution ceramics in which the AF phase (or PF phase) and the FE phase coexist having a morphotrophic phase boundary (MPB), especially the solid solution ceramics having its MPB between MPB(h) and MPB(m).

More specifically, the material of this invention is PLZT having the composition expressed by the general formula:

where $0 \leq x \leq 0.2$ ; $0 \leq y \leq 0.6$
$0 \leq \alpha \leq 1$ ; $0 \leq \beta \leq 1$
$0 \leq x+\alpha \leq 1$ ; $0 \leq y+\beta \leq 1$ L represents one of divalent and trivalent alkaline-earth or rare-earth elements, and M indicates a tetravalent or pentavalent metallic element.

The electro-optic ceramics of the invention has high electro-optic effect. For example, the contrast ratio $I_{max}/I_{min}$ is large, the image drawn by the previous electric field can easily be erased by applying a reverse electric field, and the state $I_{min}=0$ is AF phase and it is virtually optically isotropic since the material is ceramic. Therefore the contrast ratio can be made infinitely large (I = 0) without depending on the angle of incidence to the ceramic material. This makes it possible to produce an electro-optic element suited for wide angle image devices.

DESCRIPTION OF THE PREFERRED EMBODIMENTS

EXAMPLE 1

1. The mixed powder of the composition of (a), (b), (c), in (2) below is hot-pressed at a temperature of 1,200°C., under the pressure of 2,000 lbs/in² for 16 hours. The resultant hot-pressed ceramics is sliced to 0.2 mm. thick wafers by diamond slicer. The both surfaces of each wafer are polished to form a PLZT plate with optically flat planes. From this PLZT plate a disk 15 mm. in diameter, 150 μm in thickness is obtained. This disk is placed in a furnace of about 500°C. and SnCl₄ is sprayed onto the two opposite main planes whereby transparent electrodes are formed. Electric lead wires are connected to the electrodes. On this sample, the electric displacement versus electric field characteristics (hereinafter briefly, D-E characteristic) and the transmitted light versus electric field intensity characteristic (hereinafter briefly, I-E characteristic) are measured.

Figure 6:
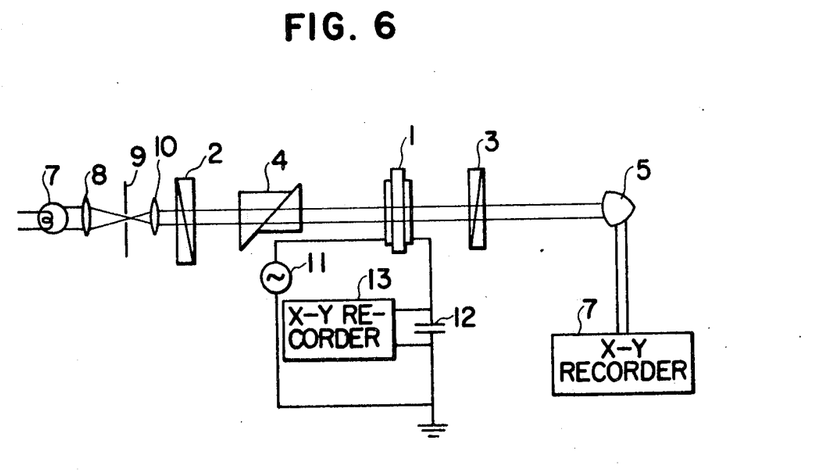
FIG. 6 is a diagram showing an electro-optic ceramic material of the invention in relation to an I-E characteristic measuring device.

In FIG. 6, the numeral reference 1 denotes the sample being measured, 2 and 3 polarizing plates, 4 a Vabinet Solaille compensator, 5 a photo-detector, 6 an X-Y recorder for recording the I-E characteristics, 7, 8, 9 and 10 a light source, a lens, a slit and a lens respectively, 11 an electric source of alternating voltage, 12 a standard capacitor, and 13 an X-Y recorder for recording the D-E characteristics.

2. The following samples are prepared
   a. the sample formed of the following powder materials in the composition:

| | |
   |---|---|
   | PbZrO₃ | 35 mole percent |
   | PbTiO₃ | 65 mole percent |
   | La₂O₃ | 8 mole percent |

(Note: This sample is hereinafter referred to as PLZT 8/65/35.)

b. the sample formed of the following powder materials in the composition:

| | |
   |---|---|
   | PbZrO₃ | 35 mole percent |
   | PbTiO₃ | 65 mole percent |
   | La₂O₃ | 8.2 mole percent |

(Note: This sample is hereinafter referred to as PLZT 8.2/65/35.)

c. the sample formed of the following powder materials in composition:

| | |
   |---|---|
   | PbZrO₃ | 35 mole percent |
   | PbTiO₃ | 65 mole percent |
   | La₂O₃ | 8.6 mole percent |

(Note: This sample is hereinafter referred to as PLZT 8.6/65/35.)

Figure 7:
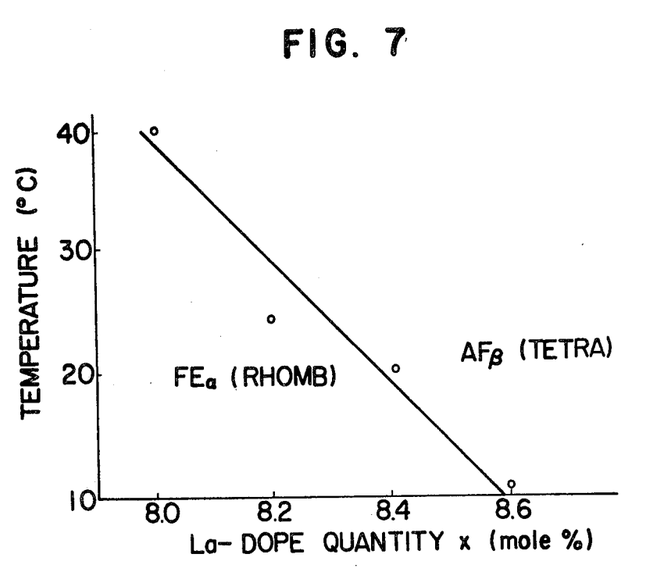
FIG. 7 is a diagram showing phase changes with changes in temperature and in the amount $x$ of La in $Pb_{1-x}La_x(Zr_{.65}Ti_{.35})_1-(x/4).O_3$.

FIG. 7 shows the phase diagram drawn on $Pb_{1-x}La_x(Zr_{.65}Ti_{.35})_{1-x/4}O_3$ (where $0<x<1$) with respect to the amount of additive La. In FIG. 7, the abscissa stands for the amount of additive La in mole percent, and the ordinate for the temperature in °C., measured in MPB(m).

Figure 8:
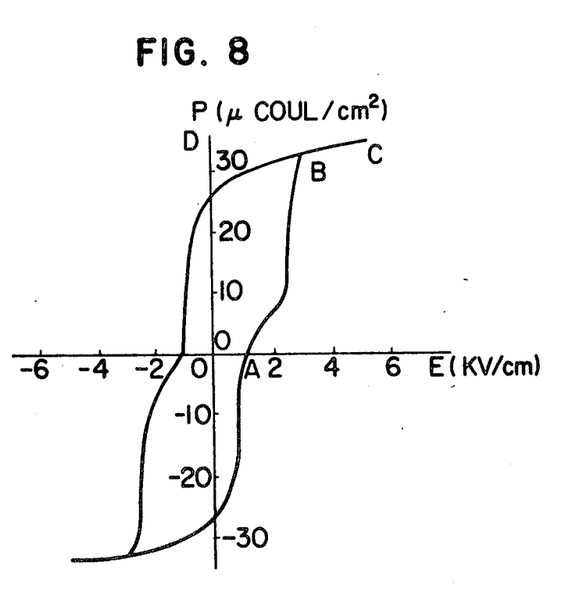
FIG. 8 is a diagram showing the D-E characteristic of PLZT 8.4/65/35.
Figure 9:
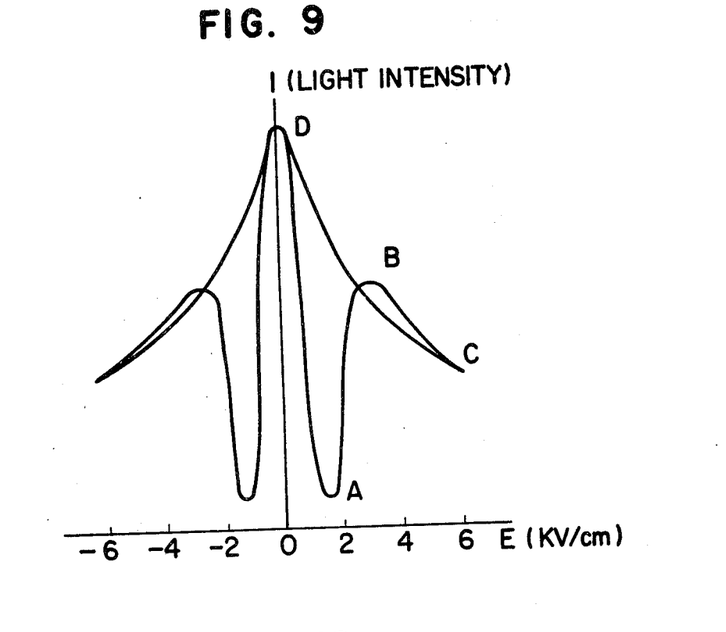
FIG. 9 is a diagram showing the I-E characteristic of PLZT 8.4/65/35.

Using the sample PLZT 8.4/65/35 [wherein 8.4/65/35 represents the material when $x$ is 0.084, $y$ is 0.65, Z is 0.35 in the formula as above-mentioned in (a), (b) and (c)] in the composition as in (1) above, the D-E characteristic and the I-E characteristic are measured with the device as in FIG. 6, FIGS. 8 and 9 show these characteristics, respectively.

In the device as in FIG. 6, the double refraction with respect to $I_{max}$ of the sample 1 interposed between the polarizing plates 2 and 3 is examined by using the Vabinet Solaille compensator 4. The result is that the double refraction $\Delta n = 0$ in the error range of $\Delta n \leq 10^{-6}$. It is found that the change in the amount of light in the I-E characteristic of FIG. 9 is ascribed not to the double refraction but to the change in the scattering light due to the electric field applied. In FIG. 9, the points D and A on the D-E characteristic are made corresponding to $I_{max}$ and $I_{min}$, respectively, and thus most part of the curve linking between A and D can be approximated by straight segments. Hence it can be expected that the range of linear change in the amount of light with respect to the electric field is markedly expanded as long as the curve A--D is used. This indicates that the range of bit numbers corresponding to the brightness of the image is expected to be expanded when the material of the invention is used for the image storage device. This application will be described in Example 2 below.

Various materials may be developed according to the teaching of the invention. Typical materials of them and their characteristics are summarized in Table 1.

Table 1

Various New Materials of the Invention and Their Characteristics

| Composition | State | Tc | Tm | Th | Te | Tc/E (Degree cm/RT) |
| --- | --- | --- | --- | --- | --- | --- |
| $Pb_{.94}La_{.065}(Zr_{.80}Ti_{.20})_{.985}.O_3$ | AF↔FE | −10°C. | 25°C. | 60°C. | 140°C. | 100 |
| $Pb_{.93}La_{.05}(Zr_{.84}Ti_{.16})_{.95}Fe_{.05}.O_3$ | AF↔FE | −30°C. | 25°C. | 80°C. | 160°C. | 120 |
| $Pb_{.98}La_{.02}(Zr_{.92}Ti_{.08})_{.995}.O_3$ | AF↔FE | | 25°C. | 75°C. | 180°C. | 120 |
| $Pb(Zr_{.95}Ti_{.05}).O_3$ | " | | 25°C. | 50°C. | 200°C. | 60 |
| $Pb_{.84}La_{.16}(Zr_{.30}Ti_{.70})_{.96}.O_3$ | PE↔FE | 25°C. | 25°C. | 27°C. | | 10 |
| $Pb_{.80}La_{.20}(Zr_{.15}Ti_{.85})_{.95}.O_3$ | " | 25°C. | 25°C. | 26°C. | | 5 |
| $Pb_{.76}La_{.24}(Zr_{.05}Ti_{.95})_{.94}.O_3$ | " | 25°C. | 25°C. | 26°C. | | 2 |
| $Pb(Zr_{.455}Sn_{.455}Ti_{.09}).O_3$ | AF↔FE | 20°C. | 30°C. | 40°C. | 70°C. | 4.8 |
| $Pb_{.99}(Zr_{.60}Sn_{.40}Ti_{.07})_{.98}Nb_{.02}.O_3$ | AF↔FE | −20°C. | 25°C. | 70°C. | 150°C. | 100 |
| $Pb_{.88}La_{.06}Sr_{.06}(Zr_{.68}Ti_{.32})_{.97}.O_3$ | PE↔FE | 15°C. | 25°C. | 35°C. | 70°C. | 8 |
| $Pb_{.84}L_{.05}Sr_{.11}(Zr_{.60}Ti_{.40})_{.96}.O_3$ | AF↔FE | −5°C. | 25°C. | 50°C. | 80°C. | 80 |
| $Pb_{.76}La_{.04}Ba_{.20}(Zr_{.60}Ti_{.40})_{.96}.O_3$ | " | 10°C. | 25°C. | 40°C. | 100°C. | 60 |
| $Pb_{.94}La_{.06}(Hf_{.80}Ti_{.20})_{.985}.O_3$ | AF↔FE | −10°C. | 25°C. | 60°C. | 130°C. | 100 |
| $Pb_{.93}La_{.07}(Hf_{.75}Ti_{.25})_{.983}.O_3$ | " | 0 | 25°C. | 50°C. | 80°C. | 90 |
| $Pb_{.93}La_{.06}Sr_{.01}(Zr_{.65}Ti_{.35})_{.983}.O_3$ | " | 25°C. | 25°C. | 32°C. | 120°C. | 8 |
| $Pb_{.921}La_{.079}(Zr_{.65}Ti_{.35})_{.98}.O_3$ | " | 38°C. | 45°C. | 55°C. | 75°C. | 45 |
| $Pb_{.919}La_{.081}(Zr_{.65}Ti_{.35})_{.98}.O_3$ | " | 28°C. | 35°C. | 45°C. | 65°C. | 45 |
| $Pb_{.915}La_{.085}(Zr_{.65}Ti_{.35})_{.979}.O_3$ | " | 8°C. | 15°C. | 25°C. | 45°C. | |

In Table 1, AF-FE and PE-FE indicate the reversible phase transition between the anti-ferroelectric phase and the ferroelectric phase, and between the para-electric phase and the ferroelectric phase, respectively.

Figure 10:
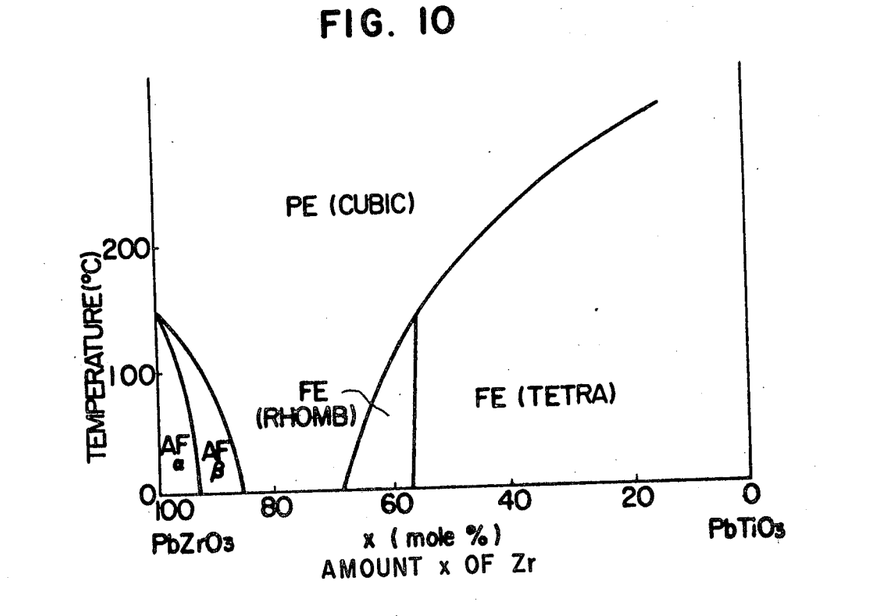
FIG. 10 is a diagram showing phase changes with changes in temperature and in the amount $x$ of ZR in $Pb_{.86}La_{.06}(Zr_xTi_{1-x})_{.97}.O_3$.
Figure 11:
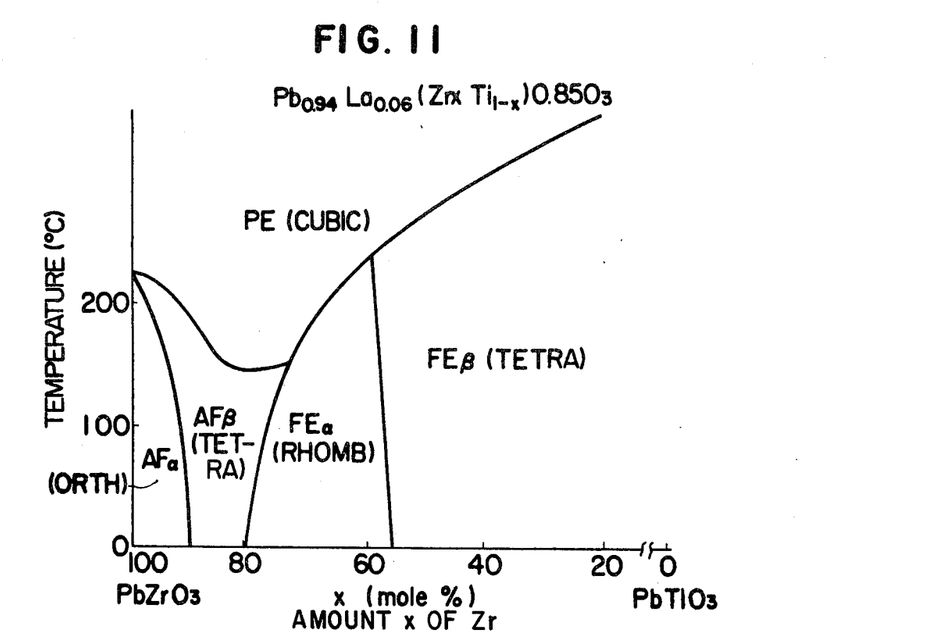
FIG. 11 is a diagram showing phase changes with changes in temperature and in the amount $x$ of Zr in $Pb_{.94}La_{.06}(Zr_xTi_{1-x})_{.15}.O_3$.
Figure 12:
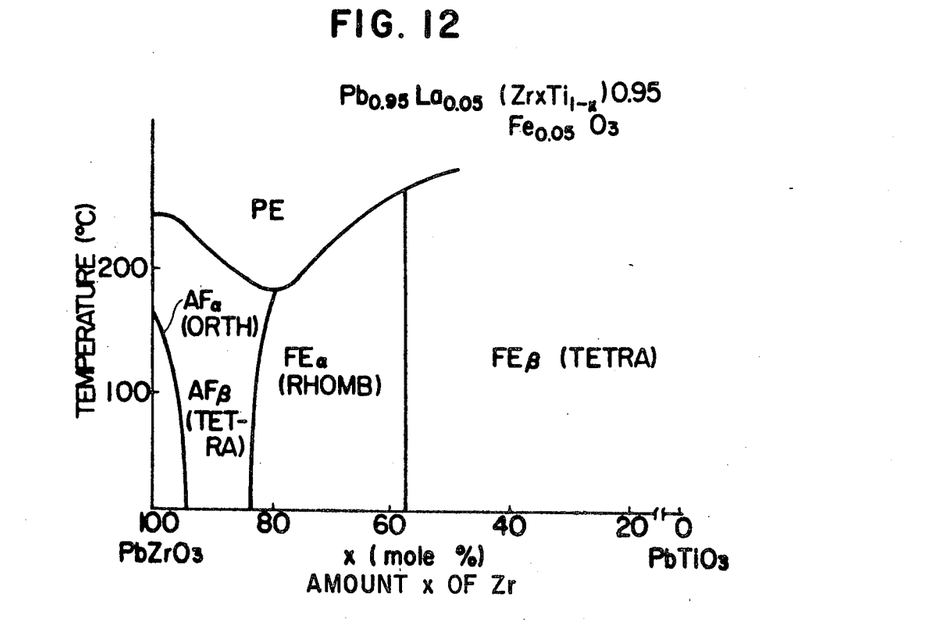
FIG. 12 is a diagram showing phase changes with changes in temperature and in the amount $x$ of Zr in $Pb_{.95}La_{.05}(Zr_xTi_{1-x})_{.95}Fe_{.05}.O_3$.

The phase diagrams of the materials shown in Table 1 are of the same MPB. For example, FIGS. 10, 11 and 12 show phase diagrams of $Pb_{.916}La_{.14}(Zr_{.65}Ti_{.35})_{.979}.O_3$ (more generally, $Pb_{1-x}La_x (Zr_{.65}Ti_{.35})_{1-[x/4]}.O_3$ as in FIG. 7), $Pb_{.93}La_{.06}Sr_{.06}(Zr_{.16}Ti_{.20})_{.97}.O_3$ (more generally, $Pb_{93}L_{06}Sr_{06}(Zr_xT_{1-x})_{.97}.O_3$), and $Pb_{.94}La_{.06}(Zr_{.60}Ti_{.20})_{.65}.O_3$ (more generally, $Pb_{.94}La_{.06}(Zr_xTi_{1-x})_{.65}.O_3$), and $Pb_{.95}La_{.05}(Zr_{.64}Ti_{.16})_{.95}Fe_{.05}.O_3$ (more generally, $Pb_{.95}La_{.05}(Zr_xTi_{1-x})_{.05}Fe_{.05}.O_3$).

EXAMPLE 2

A sample of $Pb_{.95}La_{.05}(Zr_{.64}Ti_{.16})_{.95}Fe_{.05}.O_3$ composition is prepared in the same manner as in Example 1. This material is hot-pressed to a transparent bowl 35 mm in diameter and 15 mm in height. Then the sample is cut along the circumferential direction whereby a bowl 30 mm across is obtained. This sample is sliced into a disk 0.25 mm thick. The both surfaces thereof are polished to a disk 200 μm thick. The polished disk is visibly transparent. Then the sample disk is coated with a transparent film composed essentially of $SnO_2$ about 1400 A thick. This coating serves as an anti-reflection film for the transparent electrodes and enhances the transparency of the sample.

Figure 13A:
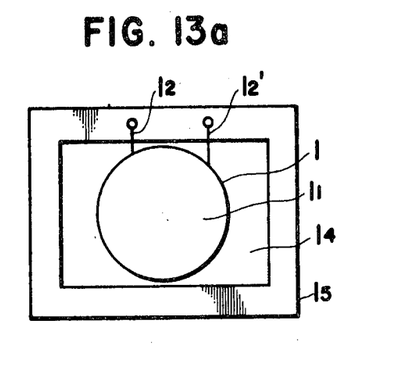
FIGS. 13a and 13b are a frontal view and a longitudinal sectional view, respectively, showing an electro-optic element (image storage device) of the invention.
Figure 13B:
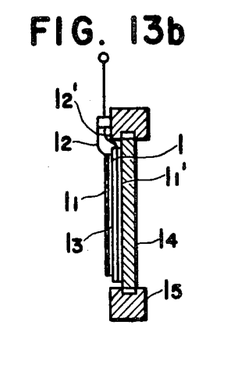

As shown in FIG. 13a (frontal view) and FIG. 13b (sectional view), the film $l_{1'}$ is used as the electrode, and the other main plane is coated with an organic photo-conductive polymer $l_3$ (or usual photo-conductive material) such as composed essentially of polyvinyl carbazole (PVK) to a thickness of about 3 μm. After drying, the sample is heated to a temperature of about 150°C. Then the sample is placed in a vacuum vessel in which oxygen gas is introduced to about $10^{-3}$ to $10^{-4}$ mmHg. In this atmosphere, $In_2O_3$ is deposited on the sample by evaporation, and an electrode $l_1$ of low electric resistance and high transparency is disposed. Lead wires $l_2$ and $l_{2'}$ are connected to the transparent electrodes $l_1$ and $l_{1'}$. The sample is secured to the slide holder comprising a glass plate $l_4$ mounted into a frame $l_5$ whereby an image storage device as shown in FIGS. 13a and 13b is realized.

This image storage device 1 is subjected to image-erasing treatment in the manner as will be described later. Then the master image from a 35 mm. film 14 is constructed on the surface of the device 1 through a lens 15. At the same time a DC voltage of +200V is applied to the lead wires $l_2$ and $l'_2$ of the image storage device 1 for the period of one second. The electric resistance of the photo-conductive film decreases in the bright portions of the image, to allow electric charges to be carried to the device 1, while, the photo-conductive film becomes insulated in the dark portions of the image formed. As a result, the electric field applied forms one-dimensional distribution on the electro-optic ceramic plate 1 according to the brightness of the image. A ferroelectric phase is induced in the area where a high electric field is applied. The quantity of grains where the ferroelectric phase is induced is nearly proportional to the value of the electric field applied. In the above manner the master image is written on the electro-optic ceramic device. Thus a spatial distribution of grains having ferroelectricity is formed in the device 1 according to the contrast of the image.

Figure 14:
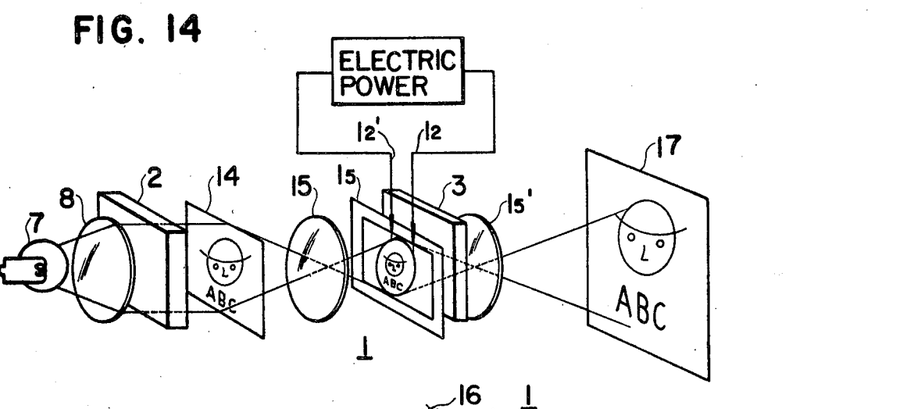
FIG. 14 is a diagram showing how the image is stored and reproduced by the image storage device shown in FIG. 13.

The stored image is reproduced in the following manner. Linearly polarized light is applied through a polarizer 2 to the electro-optic ceramic device 1 as shown in FIG. 14. The light transmitted therethrough is focused on a screen 17 through a lens 15' by way of an analyzer 3 disposed in crossed-polar configuration whereby the image is reproduced on the screen. The reproduced image observed on the screen was clear in excellent contrast, being least deteriorated from the master image. The contrast ratio of the reproduced image was measured to be 200 maximum at 25°C. without being appreciably dependent upon temperature.

The device 1 having an image stored was subjected to temperature variation in the range from 0 to 50°C. or placed for one month in a room where the temperature was 20°C. ± 5°C. The sample was thereafter tested and found that its stability was not appreciably affected by temperature.

EXAMPLE 3

In Example 2, the device 1 having an image stored was heated above 80°C. It was found that the higher the temperature, the sooner the image vanishes. By the use of a device as in FIG. 14, the screen remained dark. The sample used is such that $Tm$ is about 25°C. and $Th$ is about 80°C. This indicates that the contrast ratio of the reproduced image is maximum in the vicinity of $Tm$, and that the image can be erased by heating the device to a temperature above $Th$.

Instead of heating above $Th$, a reverse electric field may be applied for a short period whereby the stored image is erased. For example, an electric field of −200V was applied to the device for half a second, or −150V for 2 seconds whereby the stored image was perfectly erased.

Instead of using a reverse electric field, the lead wires may be reversed at the connection to the power source to effect a reverse electric field applied to the device.

It was experimentally found that a reverse pulse voltage applied several times is better than a reverse electric field in order to perfect the erasing of the image.

Practically, it can be said that the application of an alternating electric field for several cycles is effective besides heating the device above $Th$ and applying a reverse electric field as described above, in order to erase the stored image.

Typical examples of electro-optic materials of MPB composition comprising an anti-ferroelectric phase (or para-electric phase) and a ferroelectric phase are summarized in Table 1, which differ from each other with respect to optical properties. Among the shown materials, $PbZrO_3$--$PbTiO_3$--$LaFeO_3$ has remarkable light-scattering effect. For example, $Pb_{.95}La_{.05}(Zr_{.84}Ti_{.16})_{.9\text{-}5}Fe_{.05}O_3$ assumes an anti-ferroelectric state at room temperature and has high transparency. However, once an electric field is applied to this material, a ferroelectric phase is induced and light-scattering becomes great. The image stored in the device made of this material was observed capable of providing a clear reproduced image without using a polarizer. The reproduced image can be observed more clearly by reflected light than by transmitted light. A concrete example of this idea will be described below.

EXAMPLE 4

A device similar to that in Example 1 was prepared from $Pb_{.95}La_{.05}(Zr_{.84}Ti_{.16})_{.95}Fe_{.05}O_3$.

Figure 15:
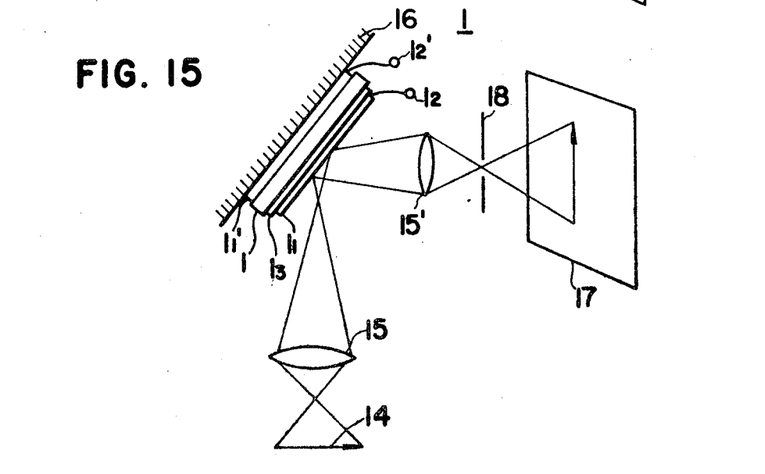
FIG. 15 is a diagram showing the principles of another electro-optic element embodying this invention.

As shown in FIG. 15, the device 1 is attached to the surface of a mirror 16. The light transmitted through a master image 14 is reflected from the mirror 16 and reaches a screen 17. Lenses L5 and 15' are disposed so that the image is constructed clearly on the screen.

Under this condition, an electric field of about 200V is applied to the device 1 whereby the image is stored therein. In the area where the image is formed brightly, light scatters widely and therefore no light reaches the screen. Thus the image reproduced on the screen becomes negative with respect to the master image. In other words, the master image is stored negatively.

The image reproduced on the screen 17 becomes more sharply as a pinhole aperture 18 is narrower. Experimentally, the contrast of the image reproduced was very high when the diameter of the pinhole aperture is approximately 2mm.

The compound material comprising $LaFeO_3$ is characterized in that its light-scattering is great and that the image storage device made of this material obviates the need for the polarizing plate.

Generally, light-scattering is high in the element whose grain size is large, such as in the element comprising $LaFeO_3$. Hence this type of element is suited for applications where light-scattering is important, while, the element whose grain size is small offers small light-scattering. Hence this type of element is suited for applications where it is to avoid light-scattering and double refraction is desired. The grain size is larger than approximately 3 $\mu$ for the element for light-scattering, and smaller than approximately 3 $\mu$ for the element for double refraction applications.

As has been described above, the invention utilizes the difference in the optical properties of the transparent ceramic material comprising a solid solution compound in which a ferroelectric phase and an anti-ferroelectric phase, or a ferroelectric phase and a para-electric phase coexist having a morphotrophic phase boundary. An electric field is applied to the solid solution whereby the anti-ferroelectric phase (or para-electric phase) and the ferroelectric phase are arbitrarily switched from one another. Compared with the conventional ferroelectric electro-optic ceramic PLZT, the electro-optic ceramic material of the invention has a number of distinctive advantages. For example, the variable range of the light intensity is wide, the light leakage in the off state can be minimized, and the light intensity can be varied only by applying an electric field in the thickness direction. Thus the material of the invention can be used for wide applications such as light modulator, analog type optical memory, bistable optical memory, image display device and image storage device.

From the foregoing examples it will be appreciated that many electro-optic ceramic materials are encompassed by the general formula. Among the metals represented by L in this formula are Mg, Ca, Sr, Bg, Sc, Y, the rare-earth element having atomic numbers from 58 through 71 and from 90 through 101 and that among those represented by M are Fe, Ni, Co, Hf, Si, Ge, Sn, V, Nb, and Ta.

While the novel embodiments of the invention have been described, it will be understood that various omissions, modifications and changes in these embodiments may be made by one skilled in the art without departing from the spirit and scope of the invention.

What is claimed is:

1. A longitudinal electro-optic ceramic material comprising a solid solution in which two phases coexist with one another with a morphotropic phase boundary therebetween, one of said phases being selected from the group consisting of an anti-ferroelectric phase and a para-electric phase, the other of said phases being a ferroelectric phase.

2. The longitudinal electro-optic ceramic material of claim 1, having a composition represented by the following chemical formula wherein $0 \leq x \leq 0.2$, $0 < y \leq 0.6$, $0 \leq \alpha < 1$, $0 \leq \beta \leq 1$, $0 < y + \beta \leq 1$, L is at least one member selected from the group consisting of divalent and trivalent alkaline earth elements and rare earth elements, and M is at least one metal element selected from the group consisting of tetravalent and pentavalent metal elements.

3. The longitudinal electro-optic ceramic material of claim 2, wherein L is selected from the group consisting of Mg, Ca, Sr, Ba, Sc, Y, and the rare-earth elements having atomic numbers from 58 through 71 and from 90 through 101.

4. The longitudinal electro-optic ceramic material of claim 3, wherein M is selected from the group consisting of Fe, Ni, Co, Hf, Si, Ge, Sn, V, Nb and Ta.

5. A method for shifting the morphotropic phase boundary of a longitudinal electro-optic ceramic material composed of a solid solution in which two phases coexist with one another with a morphotropic phase boundary therebetween, one phase being selected from the group consisting of an anit-ferroelectric phase and a para-electric phase and the other phase being a ferroelectric phase, said method comprising (a) maintaining said longitudinal electro-optic ceramic material at a temperature intermediate the temperature generating the heating morphotropic phase boundary in said longitudinal electro-optic ceramic material and the temperature generating the limiting morphotropic phase boundary in said longidutinal electro-optic ceramic material, and (b) applying an electric field of a predetermined polarity to said longitudinal electro-optic ceramic material, whereby the morphotropic phase boundary in said longitudinal electro-optic ceramic material is shifted reversibly between said one phase and said ferroelectric phase.

6. The method of claim 5, wherein said longitudinal electro-optic ceramic material has a composition represented by the following chemical formula wherein $0 \leq x \leq 0.2$, $0 < y \leq 0.6$, $0 \leq \alpha < 1$, $0 \leq \beta \leq 1$, $0 < y + \beta \leq 1$, L is at least one member selected from the group consisting of divalent and trivalent alkaline earth elements and rare earth elements, and M is at least one metal element selected from the group consisting of tetravalent and pentavalent metal elements.

7. The method of claim 6, wherein L is selected from the group consisting of Mg, Ca, Sr, Ba, Sc, Y, and the rare-earth elements having atomic numbers from 58 through 71 and from 90 through 101.

8. The method of claim 7, wherein M is selected from the group consistig of Fe, Ni, Co, Hf, Si, Ge, Sn, V, Nb and Ta.

9. A method for shifting the morphotropic phase boundary of a longitudinal electro-optic ceramic material composed of a solid solution in which two phases coexist with one another with a morphotropic phase boundary therebetween, one phase being selected from the group consisting of an anti-ferroelectric phase and a para-electric phase, the other phase being a ferroelectric phase, said longitudinal electro-optic ceramic material having a composition intermediate a composition point at which the heating morphotropic phase boundary is generated at a predetermined morphotropic phase boundary-generating temperature and a composition point at which the limiting morphotropic phase boundary is generated at said predetermined temperature, said method comprising (a) maintaining said longitudinal electro-optic ceramic maerial at said predetermined temperature, and (b) applying an electric field of a predetermined polarity to said longitudinal electro-optic ceramic material, whereby the morphotropic phase boundary in said longitudinal electro-optic ceramic material is shifted reversibly between said one phase and said ferroelectric phase.

10. The method of claim 9, wherein said longitudinal electro-optic ceramic material has a composition represented by the following chemical formula wherein $0 \leq x \leq 0.2$, $0 < y \leq 0.6$, $0 \leq \alpha < 1$, $0 \leq \beta \leq 1$, $0 < y + \beta \leq 1$, L is at least one member selected from the group consisting of divalent and trivalent alkaline earth elements and rate earth elements, and M is at least one metal element selected from the group consistig of tetravalent and pentavalent metal elements.

11. The method of claim 10, wherein L is selected from the group consisting of Mg, Ca, Sr, Ba, Sc, Y, and the rare-earth elements having atomic numbers from 58 through 71 and from 90 through 101.

12. The method of claim 11, wherein M is selected from the group consisting of Fe, Ni, Co, Hf, Ge, Sn, V, Nb and Ta.

13. An image storage device comprising a wafer comprising a longitudinal electro-optic ceramic material, said wafer defining two main surfaces for transmission of light through said wafer, a transparent electrode layer attached to one of the main surfaces of said wafer, a photo-conductive film attached to the other main surface of said wafer, a transparent electrode connected to said photo-conductive film, and electric lead wires connected to said transparent electrodes for attaching said image storage device to an external power source, said longitudinal electro-optic ceramic material comprising a solid solution in which two phases coexist with one another with a morphotropic phase boundary therebetween, one of said phases being selected from the group consisting of an anti-ferroelectric phase and a para-electric phase and the other of said phases being a ferroelectric phase.

14. An image write device comprising:
an image storage device comprising a wafer comprising a longitudinal electro-optic ceramic material, said wafer defining two main surfaces for transmission of light through said wafer, a transparent electrode layer attached to one of the main surfaces of said wafer, a photo-conductive film attached to the other main surface of said wafer, a transparent electrode connected to said photo-conductive film, and electric lead wires connected to said transparent electrodes, said longitudinal electro-optic ceramic material comprising a solid solution in which two phases coexist with one another with a morphotropic phase boundary therebetween, one of said phases being selected from the group consisting of an anti-ferroelectric phase and a para-electric phase and the other of said phases being a ferroelectric phase;

means for producing a light image on said image storage device; and means for providing an electric potential across the electrical leads in said image storage device.

15. The image write device of claim 14 comprising a linearly polarized light applying means spaced from said image storage device and positioned so as to shine linearly polarized light on said image storage device; a master image generating plate disposed between said light applying means and said image storage device; and an optical lense disposed between said master image generating plate and said image storage device.

16. The image write device of claim 15, further comprising screen means spaced from said image storage device on a side of said image storage device opposite said linearly polarized light applying means; a second optical lense disposed between said screen means and said image storage device; and photoanalyzing means disposed between said second optical lense and said image storage device.

17. A master image reproducing device comprising:
a reflecting plate;
an image storage device disposed on the reflecting surface of said reflecting plate, said image storage device comprising a wafer comprising a longitudinal electroptic ceramic material, said wafer defining two main surfaces for transmission of light through said wafer, a transparent electrode layer attached to one of the main surfaces of said wafer, a photo-conductive film attached to the other main surface of said wafer, a transparent electrode connected to said photoconductive film and electric lead wires connected to said transparent electrodes for attaching said image storing device to an external power source, said longitudinal electro-optic ceramic material comprising a solid solution in which two phases coexist with one another with a morphotropic phase boundary therebetween, one of said phases being selected from the group consisting of an anti-ferroelectric phase and a para-electric phase and the other of said phases being a ferroelectric phase;
means for forming a light image on said image storage device, said image forming means positioned at an acute angle with respect to said reflecting plate; and
screen means for receiving a light image generated by said storage device.

18. The master image reproducing image device of claim 17, wherein said image forming means comprises a master image generating plate and a first optical lense disposed between said master image generating plate and said image storage device; said device further including means defining a pin hole disposed between said screen means and said image storage device, and a second optical lense disposed between said means defining a pin hole and said image storage device.

19. The image storage device of claim 13, further comprising means for applying an electric field across said wafer from one of said main surfaces to the other of said main surfaces only.

20. The image storage device of claim 19, wherein said means for applying an electric field is arranged to apply an electric field transversely to said two main surfaces.

21. An image storing device according to claim 20, wherein said two main surfaces are parallel and further wherein said means for applying an electric field is arranged to apply an electric field in a direction perpendicular to said two main surfaces.

22. The image write device of claim 14, wherein said two main surfaces are parallel and further wherein said means for providing an electrical potential provides said electrical potential in a direction perpendicular to said main surfaces.

23. The master image reproducing device of claim 17, wherein said means for forming a light image is arranged so that said light image passes through at least one of said transparent electrodes.

24. The master image reproducing device of claim 23, wherein said two main surfaces are parallel.

25. The image storage device of claim 14, wherein said means for forming a light image is arranged so that said light image passes through at least one of said transparent electrodes.

26. An image storage device comprising a wafer defining a light image-receiving surface and a second surface spaced therefrom and parallel thereto, and means for applying an electric potential in a direction perpendicular to said light receiving surface and said second surface only, said electro-optic ceramic material comprising a solid solution in which two phases coexist with one another with a morphotropic phase boundary therebetween, one of said phases being selected from the group consisting of an anti-ferroelectric phase and a paraelectric phase and the other of said phases being a ferroelectric phase.

27. A method for recording information in the form of an electrical field having a variable potential across the surface of the electrical field corresponding to the information to be stored and retrieved, said method comprising applying said electrical field across an electro-optic wafer having two main faces parallel with one another, said electrical field being applied across said parallel faces in a direction perpendicular to said parallel faces only, said wafer being formed from an electro-optic ceramic material composed of a solid solution in which two phases coexist with one another with a morphotropic phase boundary therebetween, one phase being selected from the group consisting of an anti-ferroelectric phase and a para-electric phase and the other phase being a ferroelectric phase, said electric field having a sufficient variation in potential so that the morphotropic phase boundary in the portions of said wafer receiving maximum voltage are substantially completely shifted reversibly between said one phase and said ferroelectric phase so that said portions become substantially nontransparent to light whereby an image corresponding to said electrical field is forced in said wafer, said process further comprising shining light through said wafer onto a target to form on said target a light image corresponding to said electric field.

28. The device of claim 13, wherein said longitudinal electro-optic ceramic material has a composition represented by the following chemical formula wherein $0 \leq x \leq 0.2, 0 < y \leq 0.6, 0 \leq \alpha < 1, 0 \leq \beta \leq 1, 0 < y + \beta \leq 1$, L is at least one member selected from the group consisting of divalent and trivalent alkaline earth elements and rare earth elements, and M is at least one metal elements selected from the group consisting of tetravalent and pentabalent metal elements.

29. The device of claim 28 wherein L is selected from the group consisting of Mg, Ca, Sr, Ba, Sc, Y, and the rare-earth elements having atomic numbers from 58 through 71 and 90 through 101.

30. The device of claim 28, wherein M is selected from the group consisting of Fe, Ni, Co, Hf, Si, Ge, Sn, V, Nb and Ta.

* * * * *